United States Patent [19]

Takeda et al.

[11] Patent Number: 4,754,128
[45] Date of Patent: Jun. 28, 1988

[54] OPTICAL CARDS AND PROCESSES FOR PREPARING THE SAME

[75] Inventors: Mitsuru Takeda, Yokohama; Wataru Kuramochi, Kawagoe, both of Japan

[73] Assignee: Dai Nippon Insatsu Kabushiki Kaisha, Tokyo, Japan

[21] Appl. No.: 827,714

[22] Filed: Feb. 18, 1986

[30] Foreign Application Priority Data

Feb. 18, 1985 [JP] Japan ................................ 60-29799
Dec. 17, 1985 [JP] Japan ................................ 60-283268

[51] Int. Cl.$^4$ .............................................. G06K 19/02
[52] U.S. Cl. ...................................... 235/488; 235/487
[58] Field of Search ................................. 235/487, 488

[56] References Cited

U.S. PATENT DOCUMENTS 3,873,813  2/1975  Lahr et al. .
4,132,350  1/1979  Kubota ................................ 235/488
4,230,939 10/1980  de Bont ............................... 235/488
4,304,848 12/1981  Bouldin et al. .
4,542,288  9/1985  Drexler ............................... 235/488

Primary Examiner—Harold I. Pitts
Attorney, Agent, or Firm—Parkhurst & Oliff

[57] ABSTRACT

An optical card comprising a card substrate and a light reflective layer provided on said card substrate, said light reflective layer comprising an optical reflective metallic thin film having a light information pattern formed therein is prepared by forming said optical information pattern by photoetching. According to this optical card, it is possible to readily carry out high density recording.

24 Claims, 3 Drawing Sheets

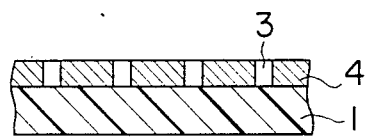
F I G. 1
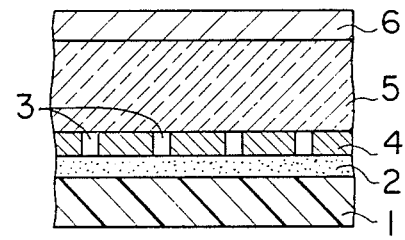
F I G. 2
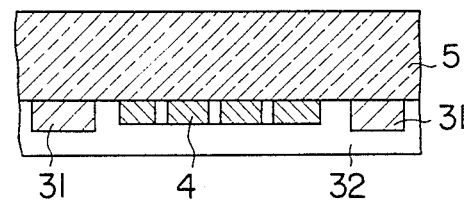
F I G. 3
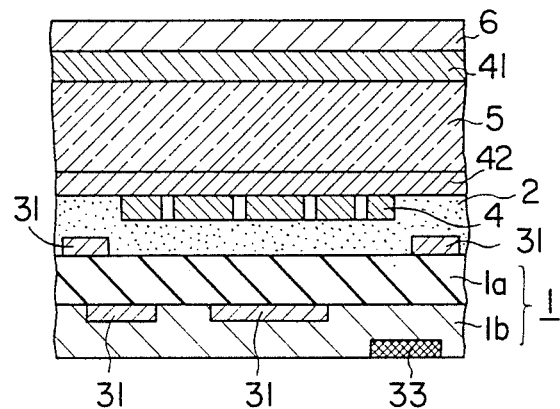
F I G. 4

OPTICAL CARDS AND PROCESSES FOR PREPARING THE SAME

BACKGROUND OF THE INVENTION

This invention relates to an optical card for carrying out optical recording and a process for preparing the same.

There is an optical recording playback system wherein a thin film of low melting metals such as tellurium and bismuth is provided on a substrate, the laminate is irradiated with a laser beam or the like to change a portion of the thin film to carry out recording, and the recorded information is subjected to optical playback. Such an optical recording playback system has an advantage that the recorded information density is dramatically higher as compared with that of prior art magnetic systems, and IC systems examined in recent years.

However, in the optical recording playback system described above, a laser beam is used and therefore high technology is required in controlling the laser beam. Further, the optical recording playback system is unsuitable for mass production. Particularly, in order to apply the optical recording playback system to cards which are issued in a large amount (ID cards such as bank's cash cards and credit cards), it is required to develop materials and systems which are cheaper and suitable for mass production.

Further, the deposition of soil onto recorded portions, and the damage of the recorded portions are undesirable in optical playback from the standpoint of high recording density.

SUMMARY OF THE INVENTION

It is therefore an object of the present invention to provide an optical card which does not incur the deposition of soil and the damage in carrying or using the optical card and which can display characteristics that it has high recording density.

It is a further object of the present invention to provide a process capable of efficiently and readily preparing an optical card while maintaining sufficient precision without using a laser beam during the production of the optical card.

As shown in FIG. 1, an optical card of the present invention fundamentally comprises a card substrate 1 and a light reflective layer 4 provided on the card substrate 1 wherein said light reflective layer 4 has an optical information pattern 3 formed therein. The light reflective layer 4 comprises a light reflective metallic thin film having a uniform phase.

Further, a process for preparing an optical card of the present invention comprises forming information pits by photoetching, in forming on a card substrate an optical information pattern composed of said information pits.

BRIEF DESCRIPTION OF THE DRAWINGS

FIGS. 1 through 4 and FIG. 11 are each sectional views or fragmentary sectional views of optical cards of the present invention;

DETAILED DESCRIPTION OF THE INVENTION

Figure 5:
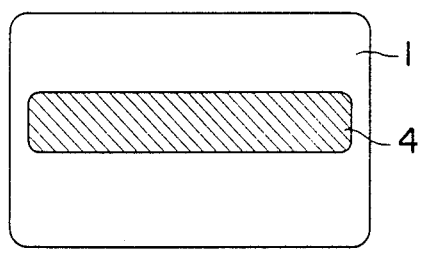
FIG. 5 is a plan view of an optical card of the present invention.

While an optical card of the present invention has a basic structure shown in FIG. 1, there are other various embodiments.

One embodiment is as shown in FIG. 2. A card substrate 1; an adhesive layer 2; a light reflective layer 4 having an optical information pattern 3 recorded therein; a protective film 5 which protects the light reflective layer 4; and a surface-cured layer 6 are laminated in this order.

Another embodiment shown in FIG. 3 is an example of a simple type optical card. A light reflective layer 4 as well as a printed layer 31 are formed on the surface of a protective film 5. Further, these layers are covered with a cover layer 32. In this case, when the cover layer 32 is transparent, optical information can be read out also from the side of said cover layer. Further, when the cover layer is opaque, the printed layer 31 may be formed on the front surface of the cover layer.

A further embodiment shown in FIG. 4 is a modified example of the optical card shown in FIG. 2. A card substrate 1 comprises a laminate of an opaque substrate layer 1a and a transparent substrate layer 1b. A printed layer 31 and a magnetic recording layer 33 are each formed at positions shown in FIG. 4. Further, a primer layer 41 is interposed between a surface-cured layer 6 and a protective film 5. An undercoat layer 42 is interposed between the protective film 5 and a light reflective layer 4.

Materials from which each layer is produced, functions thereof and the like will be described hereinafter.

Card Substrate

The card substrate 1 supports a card at a bottom position. Other recording means may be applied as needed. Materials from which the card substrate 1 is produced may generally be the same as those of cards of conventional magnetic systems. Accordingly, rigid polyvinyl chloride resins are usually used. In order to apply color or to carry out printing, white polyvinyl chloride resins are usually used. The reason why the polyvinyl chloride resins are selected is not a critical reason. Other synthetic resins can also be used. Other materials may be used provided that the card substrate is in the form of a sheet. If resistance to bending is required, metallic plates, metallic nets, woven fabrics or nonwoven fabrics may be used to reinforce the resins. Further, the card substrate may be a laminate composed of a plurality of layers.

Examples of recorded means other than light recording means applied to the card substrate 1 include hologram, imprint (embossing), photographs of face, engraving, signs, IC chips, bar codes, and general printing. These may be used in combination. Alternatively, if interchangeability with cards of magnetic systems is considered, a magnetic recording layer can also be provided.

Adhesive Layer

The adhesive layer 2 adheres the card substrate 1 to overlying layers. If the size of the light reflective layer 4 having the light information pattern 3 recorded therein is smaller than that of the protective film 5, the protective film 5 and the card substrate 1 may adhere. Accordingly, adhesives of the adhesive layer 2 are selected by considering materials from which the card substrate 1 is produced, materials from which the light reflective layer 4 is produced, and further usually materials from which the protective film 5 is produced. Examples of the adhesives include epoxy, urethane, acrylic and cyanoacrylate adhesives.

Light Reflective layer

Materials from which the light reflective layer 4 is produced are Cr, Ti, Fe, Co, Ni, Cu, Ag, Au, Ge, Al, Mg, Sb, Te, Pb, Pd, Cd, Bi, Sn, Se, In, Ga, Rb and the like. These components can be used alone or in combination (i.e., alloys). Among these components, Al, Cr, Ni, Ag and Au are preferable from the standpoints of light reflectivity and durability.

The thickness of the light reflective layer 4 composed of a thin film of metals or alloys is from 200 A to 10,000 A, preferrably from 1,000 A to 5,000 A.

The light reflective layer 4 is formed from the following metals or alloys by means such as vapor deposition, sputtering, CVD, ion plating, molecular beam epitaxy and plating.

Examples of the metals include (1) metals having excellent light reflectivity such as Al, Ni, Cr, Ag and Au. These metal-based alloys can be used. When the metals or alloys belonging to this group are used, the optical contrast between the pit portions and pit-free portions of the resulting light records is high, and therefore its readout is readily carried out.

Examples of the other metals include (2) low melting metals such as Te, Zn, Pb, Cd, Bi, Sn, Se, In, Ga, and Rb. These metal-based alloys can be also used. Examples of the preferred alloys include Te-Se, Te-Se-Pb, Te-Pb, Te-Sn-S, Sn-Cu, and Te-Cu-Pb. When the wavelength of a laser beam for readout is at least 650 nm, a Te-Cu alloy containing from 5 to 40 atomic percent of Cu or a Te-Cu-Pb alloy containing from 5 to 40 atomic percent of Cu and from 1 to 50 atomic percent of Pb based on the weight of Cu has a high optical contrast between pit portions and pit-free portions, and thus readout is readily carried out.

Examples of the metal materials which can be used include compounds which occur phase transition by irradiating with a laser beam or the like to change their light reflectivity, for example, Te oxides, Sb oxides, Mo oxides, Ge oxides, V oxides, Sn oxides, Te oxide-Ge, and Te-Sn.

Thin films of composite materials of the above metal and an organic or inorganic compound such as $Te-CH_4$, $Te-CS_2$, Te-Styrene, $Sn-SO_2$, GeS-Sn, and SnS-S, or multilayer films such as $SiO_2/Ti/SiO_2/Al$ can be used as a reflective metallic thin film which constitutes the light reflective layer.

Further, optomagnetic recording materials such as GdCo, TbCo, GdFe, DyFe, GdTbFe, GdFbeBi, TbDyFe and MnCuBi can be used as the material for the reflective metallic thin film.

The reflective metallic thin films of various types as described above can also be used in combination.

The multilayer films of metals or alloys as described above such as a multilayer film of an In film and a Te film can be used as the light reflective layer.

The optical information pattern 3 comprises a series of the recesses formed in the light reflective layer 4 or a series of holes which penetrate the light reflective layer 4. The plane form of the recesses or holes (these are referred to as "pits") is circle, ellipse, rectangle, square or the like. The size obtained by measuring their diameter or length of major axis or long side is usually from about 2 to about 200 μm. The distance between centers of adjacent pits is usually from 5 to 500 μm.

Figure 11:
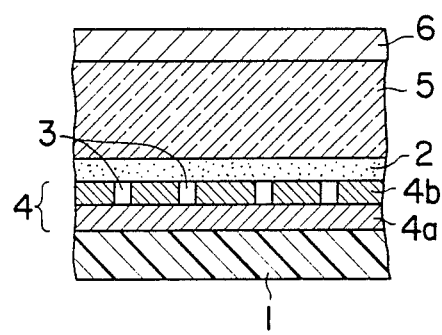

As shown in FIG. 11, the light reflection layer 4a and an optical higher reflection layer 4b provided thereon. In this case, it is desirable that the adhesive layer 2 be interposed between the protective film and the light reflective layer.

The optical lower reflection layer 4a has a lower light reflectivity as compared with that of the optical higher reflection layer 4b. Desirably, the optical lower reflection layer 4a has a black color. The layer having rough surfaces exhibits the diffused reflection of light and therefore it shows low reflectivity. Accordingly, such a layer having rough surfaces can be used. The optical lower reflection layer 4a can be formed by a printing or coating method wherein an ink composition having a high optical density is used; by another method wherein non-reflective chromium is vapor deposited; or a further method wherein colored plastic films are laminated. Alternatively, if the surface of the card substrate has optical low reflectivity, the optical lower reflection layer which is a separate layer may not be provided.

The optical higher reflection layer 4b is substantially the same as the light reflective layer 4 of a single layer.

It is preferable that the plane form of the light reflective layer 4 be an island form as shown in FIG. 5, i.e., a form wherein the ends of the light reflective layer do not come into contact with the ends of the card. The use of such a form not only excludes the contact with the air to improve corrosion resistance but also improves the aesthetic properties of the card.

Protective Film (Protective Layer)

The protective film 5 directly protects the light reflective layer 4 in the state of the card. When the light reflective layer is smaller than the card substrate, the presence of the protective film only on the light reflective layer 4 is sufficient from the standpoint of the protection of the light reflective layer. However, it is desirable that the surface of the card be flat; and the surface protection of the portions having no light reflective layers 4 may be necessary. Accordingly, it is desirable that the size of the protective film be the same as that of the optical card.

Characteristics required for the protective film 5 are high transparency, smoothness, and uniform thickness.

An example of the most preferred protective film is a film of a polycarbonate resin (its refractive index: 1.58). The thickness of this film is from about several micrometers to about 800 μm.

Examples of other preferred protective films are films of resins such as cellulose resins (e.g., cellulose triacetate resins); polyethylene terephthalate resins; acrylic resins such as polymethyl methacrylate resins; polyvinyl chloride resins; polysulfone resins such as polyethersulfone resins; and polymethyl pentene resins.

In addition, other resins such as vinyl-polyimide resins, polyether imide resins, polyether ketone resins and polyamide resins can be used.

Materials other than the resins can be used provided they have necessary performances. Examples of such materials include glasses, ceramics, papers, plastic films, woven fabrics and nonwoven fabrics. Resin films, or glasses are preferred because they meet various requirements.

The front surface and/or back surface of the protective film 5 may be subjected to physical treatments such as corona discharge treatment and plasma treatment; or chemical treatments such as oxidation treatment by acids and primer treatment as needed in order to improve the adhesion between the protective film and other layers laminated on the surfaces of the protective film.

Printed layers may be applied to the front surface and/or back surface of the protective film unless the playback of the underlying light information pattern is hindered.

Surface-Cured Layer

The surface-cured layer 6 enhances the hardness of the outermost surface present on the light reflective layer 4 which is the recording portion of the optical card; prevents damage during the carrying or usage of the card or prevents contamination materials from blocking in the cracks incurred in the damage; and improves the durability, recording (writing) precision and playback (readout) precision of the optical card.

Any materials which are used in methods known as methods of curing surfaces can be used as materials from which the surface-cured layer 6 is produced unless the characteristics of the protective film are lowered.

Examples of the materials from which the surface-cured layer 6 is produced include curable resins such as silicone, acryl, melamine, polyurethane and epoxy resins; metal oxides such as $Al_2O_3$ and $SiO_2$; and polymerized films obtained by plasma polymerization. In general, the cured film is not readily damaged, and therefore soil is not blocked in the cracked portions. Further, the cured film is chemically inert and therefore soil does not readily deposit on the surface. Even if the soil deposits, the soil is readily removed.

Cover Layer

It is desirable that the cover layer 32 used in a simple-type optical card as shown in FIG. 3 is formed from materials which have good adhesion of the cover layer to the card substrate 5, which enhance the surface hardness, and which well protect the light reflective layer 4. In addition to the materials used in the surface-cured layer described above, thermoplastic resins can also be used. Further, pigments, fillers or the like can be incorporated into the cover layer.

It is preferable that the thickness of the cover layer be in the range of from 0.1 $\mu$m to 100 $\mu$m. Particularly, when the cover layer is formed from resins, it is desirable that the thickness of the cover layer be from 2 to 50 $\mu$m.

Printing, coating, vapor deposition, sputtering, plating or other methods can be used as methods of forming the cover layer.

Further, an undercoat layer can be interposed between the cover layer and the card substrate in order to improve adhesion between the cover layer and the substrate and/or the light reflective layer. An overcoat layer such as a printed layer can be provided on the surface of the cover layer.

Further, the cover layer can be provided with a magnetic recording layer using methods such as printing, transfer, coating, vapor deposition and sputtering.

As with the surface-cured layer described above, resins which cure without any heating such as ultraviolet curable resins and electron beam curable resins are preferably used as the materials for the cover layer. This is because the thermal deformation due to heating is prevented.

Preparation of Optical Cards (1)

The materials used in a process (1) for preparing the optical card of the present invention are the same as those already described unless otherwise indicated.

The process (1) for preparing the optical card includes the steps as described above. In brief, the process (1) comprises the steps of providing a light reflective layer at the side of a protective film to form a light information pattern in the light reflective layer and laminating a card substrate to the lower surface of the light reflective layer.

Formation of Surface-Cured Layer

Figure 6:
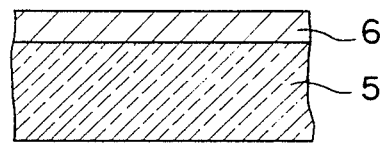
FIGS. 6 through 10 are sectional views showing steps of preparing an optical card of the present invention.

In order to form a surface-cured layer 6 on one surface of a protective film 5 as shown in a sectional view of FIG. 6, methods adapted for materials from which the surface-cured layer 6 is produced are utilized. In order to form a layer of cured resin, conventional coating methods are used. In order to form a layer of metal oxide, there is utilized a method of forming a layer of metal oxides by means of sputtering or the like; or another method wherein a layer of metal is formed by vapor deposition or the like and thereafter the layer of metal is oxidized.

Formation of Light Reflective Layer

A light reflective layer 4 which is a recording portion is formed on the surface of the protective film 5 opposite to its surface on which the surface-cured layer 6 is formed. The light reflective layer 4 of metals or alloys is usually formed by methods such as sputtering, vacuum deposition, ion plating and electroplating.

Suitable printing may be applied to portions having no light reflective layer 4.

Formation of Pphtoresist Layer

Figure 7:
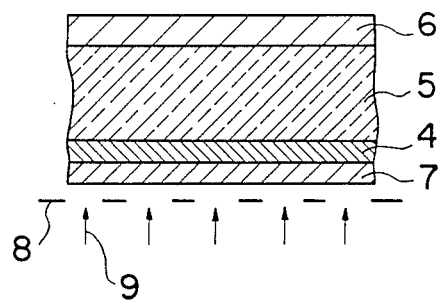

As shown in FIG. 7, a photoresist layer 7 for photoetching the light reflective layer 4 is formed on the light reflective layer 4. When the light reflective layer 4 is formed on a portion of the protective film 5, the presence of the photoresist layer 2 only on the light reflective layer is sufficient. If the formation of such a photoresist layer 2 is cumbersome, the photoresist layer may be formed on the whole surface including the portions having no light reflective layer.

Examples of the materials for forming the photoresist layer (these materials are referred to as photoresist) include (1) photodecomposable photosensitive resins including diazonium salts and azide compounds; (2) photocrosslinking photosensitive resins such as cinnamoyl, diazo, azide and acryloyl types; and (3) photopolymerizable photosensitive resins such as acrylic esters and acrylamides.

Commercially available materials can be used as the photoresist. Examples of negative-type photoresist materials include KPR and KOR, manufactured by Eastman Kodak; WAY COAT HR, manufactured by Hunt Chemical; FSR, manufactured by Fuji Yakuhin, Japan; and TPR, OMR and NONCRON, manufactured by Tokyo Ohka Kogyo, Japan. Examples of positive-type photoresist materials include Micro Posit-1300, manufactured by Shipley; WAY COAT HRP, manufactured by Hunt Chemical; OFPR, manufactured by Tokyo Ohka Kogyo, Japan; and KMPR, manufactured by Eastman Kodak. Examples of dry film-type photoresist materials include RISTON, manufactured by E. I. du Pont de Nemours & Co. Inc.; and SERITONE, manufactured by Dainichi Kako, Japan. Examples of other photoresist materials include dichromate sensitizers such as egg albumen, casein, glue, PVA and Shellac.

The photoresist layer 2 is formed from the photoresist materials. The photoresist layer 2 is formed on the light reflective layer by known application methods such as flow coating, wheeler coating, spinner coating, dipping, roller coating, spraying, electrostatic spraying, and hot pressing (the last method is used in the case of the dry films). The thickness of the photoresist layer is usually from 0.5 to 5.0 μm.

The photoresist layer 2 is usually subjected to heating referred to as prebaking.

Photoetching

The light reflective layer 4 on the protective film 5 is photoetched by utilizing the photoresist layer 7 to record an optical information pattern in the light reflective layer 4. The photoetching step is described in more detail. An optical information pattern is exposed to light, then developed to form a resist pattern, and thereafter the photoresist layer 7-free portions (exposed portions 10) of the light reflective layer is etched using an etchant to form an optical information pattern in the light reflective layer.

As shown in FIG. 7, the exposure of the optical information pattern is readily carried out by irradiating with ultraviolet rays 9 or the like via a pattern 8 such as a photographic film or a metallic mask. In addition, the exposure may be carried out by irradiating with an electron beam via a metallic mask. Alternatively, the exposure may be carried out by scanning an electron beam in the form of a pattern without using the pattern.

Figure 8:
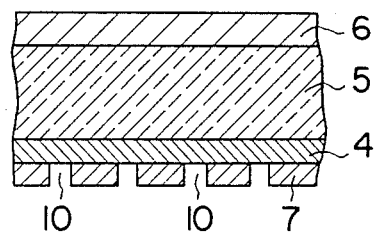

The development is to dissolve and remove the soluble portions formed by the exposure, with a solvent. The development is carried out using a developing solution. As shown in FIG. 8, the portions of the photoresist layer present on the portions to be etched of the light reflective layer are removed in the form of a pattern by development to form exposed portions 10.

Figure 9:
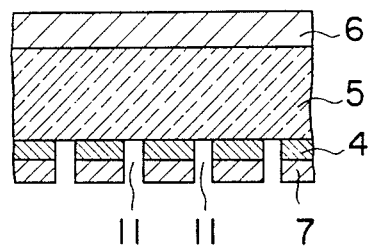

After development, as shown in FIG. 9, the photoresist layer-uncoated portions of the light reflective layer is etched using an etchant to form a light information pattern of a series of pits 11 in the light reflective layer.

After formation of the optical information pattern, the remaining photoresist layer is removed as needed.

Because (1) the step of forming the surface-cured layer on one surface of the protective film, and (2) the step of laminating the light reflective layer and the photoresist layer to the other surface of the protective film and photoetching to record the optical information pattern have no relation to each other, these two steps may be carried in any order.

Lamination

The protective film which has the surface-cured layer and the light reflective layer having the light information pattern formed therein is laminated to the card substrate using an adhesive.

In lamination, the surface-cured layer on the protective film is disposed at an upper position and the lower surface of the protective film is affixed to the card substrate. Thus, the light reflective layer present at the lower side of the protective film is situated at the inner portion of the optical card, and therefore the light reflective layer is protected without directly touching with hands and without touching with a writing or readout instrument.

Figure 10:
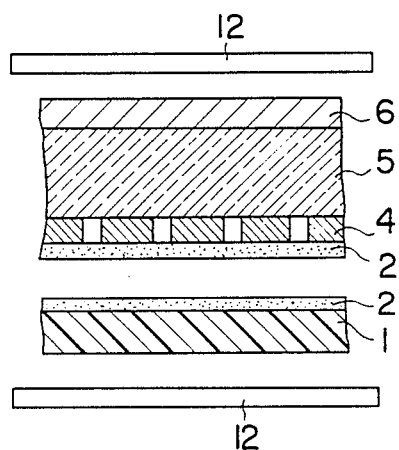

As shown in FIG. 10, the lamination is carried out by applying an adhesive 2 to at least one of surfaces to be adhered, taking an open time as needed, stacking them, and pressing by pressure means 12 such as flat presses and roller presses while heating as needed to intimately adhere them.

The optical card having predetermined form and size is produced in the following manner. The protective film and the card substrate may be previously produced in predetermined form and size. Alternatively, the protective film and the card substrate may be produced in size larger than a predetermined size, laminated and thereafter formed into the product having predetermined form and size by punching or cutting.

While the optical card has a high recording density, it is necessary to strictly carry out the scanning of readout (playback) light. Thus, in photoetching the light reflective layer, a mark for punching or cutting is provided on a portion of the light reflective layer. When punching or cutting is carried out on a basis of this mark, the recording situation of the optical information pattern is strictly disposed against each side of the optical card. Accordingly, the precision of the scanning of readout (playback) light is improved.

Preparation of Optical Cards (2)

A process (2) for preparing the optical card includes the steps described above. In brief, a light reflective layer composed of two layers is provided on a substrate of an optical card to form a light information pattern, and a protective film is laminated to the light reflective layer. That is, this process (2) is one for producing an optical card shown in FIG. 11.

Individual steps per se are the same as those of the process (1) except that an optical lower reflection layer and an optical higher reflection layer are sequentially provided on a card substrate.

First, a surface-cured layer 6 is formed on the upper surface of a protective film 5.

Besides this, a card substrate 1 is provided, and the optical lower reflection layer 4a is provided thereon. A method such as printing, coating, vapor deposition or lamination is utilized depending upon materials from which the layer 4a is produced.

The optical higher reflection layer 4b is then provided on the optical lower reflection layer 4a. The optical higher reflection layer can be formed in the same manner as that of the process (1). For example, the optical higher reflection layer is formed by methods such as sputtering, vacuum deposition, ion plating, and electroplating.

A photoresist layer 7 is formed on the optical higher reflection layer 4b, and subjected to photoetching to record a light information pattern in the optical higher reflection layer 4b. The step of forming the photoresist layer and the step of photoetching to form the optical information pattern are the same as those of the process (1).

The protective film 5 having the surface-cured layer 6 is laminated to the card substrate having the optical lower reflection layer 4a and the optical higher reflection layer 4b (having a recorded light information pattern) via an adhesive so that the optical higher reflection layer 4b and the protective film 5 are in face to face relation. The lamination step per se is the same as that of the process (1). While the adhesives described above can be used, it is preferable to use adhesives having a high playback light transmittance.

This process is particularly adapted for the production of the optical card having the structure as shown in FIG. 11. In this process, the layers 4a and 4b are intimately adhered.

Suitable printing may be applied to the lower surface of the protective layer unless the light reflective layer is covered.

Preparation of Optical Cards (3)

A process (3) for preparing an optical card is a further embodiment wherein a simple optical card as shown in FIG. 3 is produced.

In this case, a light reflective layer 4 is formed on the surface of a protective layer 5 of materials such as polycarbonate (this layer also acts as a card substrate layer) by the steps described above; a printed layer 31 is formed as needed; and thereafter a cover layer 32 is provided as described above. The steps are simplified as compared with those of the processes (1) and (2). Accordingly, in accordance with this process, a relatively thin card can be produced, and the product may be an embodiment of an optical recording tape as needed.

In addition to the basic structure, a surface-cured layer can also be provided on the surface of the protective layer 5.

When the optical card of the present invention has the surface-cured layer at the outermost surface, the deposition of soil and the damage are extremely little in carrying or using it. Further, when the protective film is formed, it is unnecessary that a light beam modulated for writing or readout be focused on the outermost surface, and the light beam is satisfactorily focused on the surface of the light reflective layer. Accordingly, even if the damage or soil on the surface may be present, it is possible to carry out writing or readout if the light beam can be introduced from the surrounding portions of cracks or soil.

Further, according to processes of the present invention, recording may be carried out without using a laser beam, and therefore high technology required for the utilization of the laser beam is unnecessary. If many materials are subjected to exposure, development and etching at a time, their mass productivity is excellent. Furthermore, light reflective layer having excellent light reflectivity and durability can be used as the light reflective layer capable of photoetching, as compared with the prior art light reflective layer capable of recording by a laser beam.

In the process for preparing optical cards according to the present invention, it is preferable that the surface of the card material except for the portion to be processed be always covered with a protective sheet in order to prevent the surface thereof from being scratched. The protective sheet is prepared by applying a slightly sticky adhesive over the surface of a sheet of paper, plastic and the like, and can be readily attached to or peeled from the surface of the card material. Preferably, the protective sheet be attached to the surface of a material such as a card substrate or a product not only during the preparation of the card but also prior to and after the preparation thereof.

Uses

The optical card of the present invention can be used, for example, for the following cards.
(a) Score information card
(b) Soft card for personal computers
(c) Telephone number card
(d) Map card
(e) Cooking information card
(f) Cyclopaedia or dictionary card
(g) Card for guides in golf links
(h) Navigator card
(i) "Go" game card
(j) Catalogue card
(k) Horticultural information card While the present invention is illustrated by the following examples, the present invention is not limited thereto. All parts used herein are by volume unless otherwise indicated.

EXAMPLE 1

First, the surface of a transparent polycarbonate resin film having a thickness of 400 μm was washed with Freon and then heat treated for 30 minutes at a temperature of 80° C. to carry out pretreatment. Aluminum was then vacuum deposited on one surface of the film to form an aluminum layer having a thickness of 0.3 μm. A photoresist (WAY COAT® HPR 204, manufactured by Fuji Hunt Electronics Technology) was then applied to the surface of the aluminum layer to a dry thickness of 1 μm by a roll coater, and subjected to prebaking for 20 minutes at a temperature of 100° C. to form a photosensitive layer.

A member prepared by writing information pits by means of an electron beam imaging apparatus was used as a mask for exposure. This mask was brought into intimate contact with the photosensitive layer described above, and the photosensitive layer was imagewise exposed by irradiating with ultraviolet rays through the mask.

After exposure, the whole was immersed in a developing solution (LSI developer, manufactured by Fuji Hunt Electronics Technology) to dissolve and remove the exposed portions of the photoresist. After removal, the whole was subjected to post-baking for 20 minutes at a temperature of 100° C., and then immersed in an etchant (comprising 16 parts of phosphoric acid, 2 parts of acetic acid, 1 part of nitric acid and 1 part of water) for 3 minutes to etch and remove the exposed portions of the aluminum layer. Thus, a light reflective metallic thin film layer having information pits in the form of a pattern was formed.

On the other hand, a white rigid polyvinyl chloride resin film was cut into a predetermined dimension to form it into the form of a bank card. Desired printing was applied to the front surface of the film and a magnetic stripe was provided on the back surface of the film by a transfer method. The polycarbonate resin film having the light reflective metallic thin film layer described above was affixed to the front surface of the film via an acrylic resin heat-sensitive adhesive so that the metal thin film layer and card substrate were in face to face relation. The whole was pressed by means of a heated roll having a surface temperature of 110° C. to form a light recording card.

EXAMPLE 2

An undercoat treatment agent (Primer PC-4, manufactured by Shin-etsu Kagaku, Japan) was applied to the front surface of a polycarbonate film having a thickness of 400 μm by a gravure method. Then, a silicone surface curing agent (a 10:1 mixture of X-12-2150(A) and X-12-2150(B), manufactured by Shin-etsu Kagaku, Japan) was applied thereon by a gravure method and heated for 30 minutes at a temperature of 100° C. to form a surface-cured layer.

An undercoat treatment agent (Tuff Coat No. 150, manufactured by Dai Nippon Ink Kagaku, Japan) was applied to the back surface of the polycarbonate film described above by a gravure method, and dried for 5 minutes at a temperature of 100° C. An aluminum layer was formed thereon under $1 \times 10^{-5}$ torr by vacuum deposition. Further, a photoresist (Micro Posit 1300-27, manufactured by Shipley) was applied to the aluminum-deposited surface described above by a gravure method and heated for 25 minutes at a temperature of 90° C. The film thickness of aluminum was 0.3 μm, and the film thickness of the photoresist was 1.0 μm.

The photoresist-coated surface thus formed was then brought into intimate contact with the masking surface of a photomask having a pattern formed therein, wherein dots having a length of 15 μm and a width of 5 μm were aligned at a pitch of 15 μm to form rows, wherein the pitch between rows was 20 μm and wherein the dot portions were light transmittant. The whole was exposed to ultrahigh pressure mercury lamp for 5 seconds from the side of the photomask (3 KW, and a distance of one meter).

The photomask pattern used was obtained by the following photoetching method. First, a Cr thin film was formed on a glass plate to a film thickness of 3000 Å by a sputtering method. A photoresist (Micro Posit 1300-27, manufactured by Shipley) was applied to the Cr thin film by means of a spinner and dried. The surface of the photoresist was irradiated with a He-Cd laser beam modulated to a beam diameter of 2 μm, on a position-controlled XY stage. Thus, rows formed by aligning dots having a length of 15 μm and a width of 5 μm at a pitch of 15 μm were formed in an array of a pitch between rows of 20 μm. The photoresist was treated with a resist developing solution (manufactured by Shipley) and heated for 25 minutes at a temperature of 130° C. Thereafter, photoetching was carried out by a ferric chloride solution to obtain a mask pattern wherein the dot portions were light transmittant.

The thus imagewise exposed photoresist layer on the polycarbonate film was then immersed in a resist developing solution (manufactured by Shipley) for 60 seconds and washed with water. The whole was immersed in an aluminum etchant having the following composition for 90 seconds, washed with water and then dried to obtain a pattern film having a pattern on the aluminum thin film.

Aluminum Etchant:
Phosphoric acid, first grade (85%); 16 parts
Acetic acid, first grade; 2 parts
Nitric acid, first grade; 1 part
Purified water; 1 part On the other hand, a card substrate was prepared in the following manner. First, patterns of letters and designs were provided on both surfaces of a white rigid polyvinyl chloride film having a thickness of 150 μm by a screen printing method. A magnetic recording layer having a width of 6.5 mm was provided on a portion of the front surface of a separate transparent rigid polyvinyl chloride film having a thickness of 100 μm. Its back surface and the printed white rigid polyvinyl chloride described above were stacked. The stack was interposed between two stainless steel plates and subjected to heating and pressure for 30 minutes at a temperature of 140° C. by means of a pressing machine to obtain a card substrate.

The thus prepared pattern film and card substrate were stacked via an epoxy resin (a 10:4 mixture of Pellnox MG 150 and Pellcure HY 306, manufacture by Nippon Pellnox) so that the pattern surface of the pattern film came into contact with the printed surface of the white rigid polyvinyl chloride film of the card substrate. The stack was pressed by means of a roll or the like. After pressing, the stack was allowed to stand for 24 hours and punched by means of a punching metal mold to obtain an optical card which did not interfere with writing or readout.

EXAMPLE 3

A carbon black-containing polyethylene terephthalate film having a length of 5 cm, a width of 5 cm and a thickness of 250 μm was used as a substrate. An aluminum layer having a thickness of 0.1 μm was formed on the substrate by vapor deposition.

A positive-type photoresist (AZ-1350J, manufactured by Shipley) was applied onto the aluminum layer of the resulting information recording medium by a spinner coating method, and an original plate having the following pattern was exposed in a ratio of 1:1 (original size). (The pattern has been obtained by longitudinally and laterally arranging circles having a diameter of 5 μm at intervals of 10 μm.) The photoresist was developed by a predetermined developing solution to form a resist pattern. Thereafter, the aluminum layer was etched by an pattern. Thereafter, the aluminum layer was etched by an etchant obtained by heating a 10% aqueous solution of phosphoric acid ($H_3PO_4$) to 60° C. Thus, the black layer underlying the etched portions appeared to form information recording portions.

On the other hand, a protective material was prepared in the following manner. First, an ultraviolet curable surface curing agent (HQ 5123U, manufactured by Fujikura Kasei, Japan) was applied to one surface of a polycarbonate film having a thickness of 500 μm by a roll coating method. The whole was irradiated with ultraviolet rays to cure to form a surface-cured layer. By a screen printing method, pattern of letters and designs were provided to the particular portions of the back surface of the polycarbonate film described above, except the portions with which the subsequently affixed information recording portions came into contact. The information recording medium and the protective layer were stacked via an urethane resin (a 10:1 mixture of Arbon EU 4201 and Arbon EHX 4201, manufactured by Alps Kagaku Sangyo, Japan) so that the printed surface of the protective layer and the information recording portions of the information recording medium were in face to face relationship. The whole was pressed by means of a roll press.

After pressing, the whole was allowed to stand for 24 hours and punched by means of a punching metal mold to obtain an optical card which did not interfere with writing or readout.

EXAMPLE 4

An Al film having a film thickness of 2,000 Å was provided on the surface of a transparent acryl plate having a thickness of 750 μm by vapor deposition. A photoresist (Micro Posit, manufactured by Shipley) was applied onto the Al film by a spinner and subjected to baking for 25 minutes at a temperature of 90° C. to form a photoresist layer having a film thickness of 1 μm.

A photomask having information pits formed therein was then intimately stacked onto the resist layer described above. The whole was exposed to an ultrahigh pressure mercury lamp (3 KW and a distance of 80 cm) for 10 seconds.

After exposure, the whole was immersed in a developing solution (Micro Posit Developer, manufactured by Shipley) to dissolve and remove the exposed portions of the photoresist. After removal, the whole was subjected to post-baking for 20 minutes at a temperature of 100° C. and then immersed in an etchant (16 parts of phosphoric acid, 2 parts of acetic acid, 1 part of nitric acid and 1 part of water) for 3 minutes to etch and remove the exposed portions of the aluminum layer. Thus, a light reflective metallic thin film layer having patterned information pits was formed.

A printed layer was then provided on the blank portions of the acryl plate described above by a screen printing method. Further, a cover layer was applied and formed so that the metallic thin film layer and the printed layer were covered with the cover layer. This cover layer was formed by irradiating with ultraviolet rays a composition wherein a white pigment was dispersed in an acrylic ultraviolet curable resin. Thus, a simple optical card was obtained.

EXAMPLE 5

An acrylic resin (Tuff Coat, manufactured by Dai Nippon Ink Kagaku, Japan) was coated onto a transparent polyester film having a thickness of 100 μm (Tetoron Film O Type, manufactured by Teijin, Japan) as a primer for vapor deposition by a roll coating method and then dried. An Al film having a film thickness of 200 Å was formed on the primer by vapor deposition. A light reflective metallic thin film layer having information pits was then formed in the Al film in the same manner as described in Example 4.

A transparent acrylic ultraviolet curable resin (UVX-HM196, manufactured by Three Bond) was then applied to the whole surface of the thus obtained metallic thin film layer, and then irradiated with ultraviolet rays to cure it. Thus, a thin and flexible optical recording material was obtained.

EXAMPLE 6

An acrylic resin (Tuff Coat, manufactured by Dai Nippon Ink Kagaku, Japan) was coated onto a polyether sulfone film having a thickness of 14 μm (manufactured by Sumitomo Bakelite, Japan) as a primer for vapor deposition by a roll coating method and then dried. An Al film having a film thickness of 200 Å was formed on the primer by vapor deposition. A light reflective metallic thin film layer having information pits was then formed in the Al film in the same manner as described in Example 4.

A transparent acrylic ultraviolet curable resin (UVX-HM 196, manufactured by Three Bond) was then applied to the whole surface of the thus obtained metallic thin film layer, and then irradiated with ultraviolet rays to cure it. Thus, a thin and flexible optical recording tape was obtained.

What is claimed is:

1. A ROM-type optical card comprising a card substrate, a light reflective layer, and a protective layer, said light reflective layer being provided on the surface of said protective layer and comprising a laminate of an optical higher reflection layer having an optical information pattern formed therein by photoetching and an optical lower reflection layer having no optical information pattern, said protective layer being bonded to the card substrate with an adhesive layer interposed therebetween so that said optical lower reflection layer and said card substrate are in face to face relationship.

2. The optical card according to claim 1 wherein said optical higher reflection layer comprises a light reflective metallic thin film formed from at least one metal selected from the group consisting of Al, Cr, Ag, Ni and Au.

3. The optical card according to claim 1 wherein a surface-cured layer is laminated on said protective layer.

4. The optical card according to claim 3 wherein a printed layer is provided on at least one portion of said card substrate.

5. The optical card according to claim 3 wherein a magnetic recording layer is provided on at least one portion of said card substrate.

6. The optical card according to claim 1 wherein the plane form of said light reflective layer is an island form.

7. The optical card according to claim 1 wherein said card substrate comprises a laminate of two layers.

8. The optical card according to claim 1 wherein said card substrate layer comprises a cover layer.

9. The optical card according to claim 8 wherein said optical card is a film-shaped tape.

10. The optical card according to claim 1 wherein said protective layer is attached to the surface of the optical card.

11. A process for preparing an optical card which comprises providing, on a card substrate, a light reflective layer having an optical information pattern composed of information pits, said process comprising forming said optical information pattern by photoetching.

12. The process according to claim 11 wherein a light reflective layer is laminated on one surface of a protective film; a photoresist layer is laminated on the light reflective layer; the laminate is subjected to photoetching to form, in said light reflective layer, an optical information pattern composed of information pits; and then the protective film having the light reflective layer having the optical information pattern thus formed is bonded to and integrated into the card substrate so that the light reflective layer and the card substrate are in face to face relationship.

13. The process according to claim 11 wherein a light reflective layer is laminated on one surface of a protective film; a photoresist layer is laminated on the light reflective layer; the laminate is subjected to photoetching to form, in said light reflective layer, an optical information pattern composed of information pits; and then the surface of the light reflective layer having the optical information pattern thus formed is covered with a coating layer.

14. The process according to claim 12 wherein a printed layer is formed on at least one portion of said protective film before or after said photoetching.

15. The process according to claim 12 wherein the remaining photoresist layer is left intact after photoetching.

16. The process according to claim 12 wherein the remaining photoresist layer is removed after photoetching.

17. The process according to claim 11 wherein the following steps (i) and (ii) are carried out in any order: (i) the step of forming a surface-cured layer on one surface of the protective film, and (ii) the step of laminating the light reflective layer and a photoresist layer on the other surface of said protective film in this order, and thereafter subjecting the laminate to photoetching thereby to record an optical information pattern in said light reflective layer; and then the protective film having both the surface-cured layer and the light reflective layer having the recorded optical information pattern thus obtained is bonded to and integrated into the card substrate with an adhesive so that the light reflective layer and the card substrate are in face to face relationship.

18. The process according to claim 11 wherein the following steps (i) and (ii) are carried out in any order: (i) the step of forming a surface-cured layer on one surface of the protective film, and (ii) the step of laminating an optical lower reflection layer, an optical higher reflection layer and a photoresist layer on the card substrate in this order, and thereafter subjecting the laminate to photoetching thereby to record an optical information pattern in only the optical higher reflection layer; and then said protective film and said card substrate are bonded and integrated with an adhesive so that the surface-cured layer-free surface of said protective film and the optical higher reflection layer provided on said card substrate are in face to face relationship.

19. The process according to claim 11 wherein the surface of the card material except for the portion to be processed is always covered with a protective sheet in order to prevent the surface thereof from being scratched.

20. The optical card according to claim 2 wherein said light reflective metallic thin film has a thickness on the order of one micron or less.

21. The optical card according to claim 20 wherein said light reflective metallic thin film has a thickness in the range of 0.1 to 0.5 micron.

22. The optical card according to claim 2 wherein said light reflective metallic thin film is formed by a method selected from the group consisting of sputtering, vapor deposition and ion plating.

23. The process according to claim 12 wherein a surface of said protective film is treated by a treatment selected from the group consisting of a corona discharge treatment and a plasma treatment to improve adhesion between said protective film and the layers laminated thereto.

24. The process according to claim 12 wherein a surface of said protective film is treated by a treatment selected from the group consisting of an oxidation treatment and a primer treatment in order to improve the adhesion between the protective layer and the other layers laminated thereto.

* * * * *